(12) United States Patent
Schnorpfeil

(10) Patent No.: US 8,344,061 B2
(45) Date of Patent: Jan. 1, 2013

(54) PROCESS FOR PRODUCING POLYOL DISPERSIONS

(75) Inventor: Christoph Schnorpfeil, Dresden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 465 days.

(21) Appl. No.: 12/513,379

(22) PCT Filed: Nov. 8, 2007

(86) PCT No.: PCT/EP2007/062042
§ 371 (c)(1),
(2), (4) Date: May 4, 2009

(87) PCT Pub. No.: WO2008/055952
PCT Pub. Date: May 15, 2008

(65) Prior Publication Data
US 2010/0048785 A1    Feb. 25, 2010

(30) Foreign Application Priority Data
Nov. 9, 2006    (EP) ..................... 06123735

(51) Int. Cl.
*C08L 67/00* (2006.01)

(52) U.S. Cl. ......... 524/539; 524/315; 524/320; 524/377

(58) Field of Classification Search ........... 524/320, 524/315, 377, 539
See application file for complete search history.

(56) References Cited

U.S. PATENT DOCUMENTS

| | | | |
|---|---|---|---|
| 5,488,085 A | * | 1/1996 | Hayes et al. ............... 525/53 |
| 5,853,942 A | * | 12/1998 | Lin ........................ 430/137.1 |
| 6,720,070 B2 | * | 4/2004 | Hamaguchi et al. ........ 428/357 |
| 6,753,402 B1 | | 6/2004 | Bauer et al. |
| 2003/0050385 A1 | | 3/2003 | Probst et al. |

FOREIGN PATENT DOCUMENTS

| | | |
|---|---|---|
| DE | 41 34 967 | 12/1992 |
| EP | 0 221 412 | 5/1987 |
| EP | 1 270 619 | 1/2003 |
| EP | 1 316 569 | 6/2003 |
| JP | 05 059134 | 3/1993 |
| JP | 5 271639 | 10/1993 |
| JP | 6 056943 | 3/1994 |
| JP | 2007224062 A * | 9/2007 |
| WO | 01 27185 | 4/2001 |
| WO | 03 076488 | 9/2003 |

OTHER PUBLICATIONS

Riess et al. "Block copolymers in emulsion and dispersion polymerization", Macromolecular Rapid Communications, 2004, 25, 401-435.*
Machine translation of JP 2007224062 A, Sep. 2007.*
John Wiley & Sons, "Encyclopedia of Polymer Science and Engineering", Wiley-Interscience Publication, vol. 3, pp. 760-765, 771-772, XP002469705, (1985).

* cited by examiner

*Primary Examiner* — Ling Choi
*Assistant Examiner* — Wenwen Cai
(74) *Attorney, Agent, or Firm* — Oblon, Spivak, McClelland, Maier & Neustadt, L.L.P.

(57) ABSTRACT

The present invention relates to polyol dispersions comprising at least one polyol and at least one polymer particle mixture comprising at least one thermoplastic polymer (P) and at least one block copolymer (B), wherein the block copolymer (B) has at least one block which is compatible with the thermoplastic polymer (P) and at least one block which is compatible with the polyol, a process for producing such polyol dispersions, their use for producing polyurethanes and a process for producing polyurethanes.

12 Claims, No Drawings

PROCESS FOR PRODUCING POLYOL DISPERSIONS

The present invention relates to polyol dispersions comprising at least one polyol and at least one polymer particle mixture comprising at least one thermoplastic polymer (P) and at least one block copolymer (B), wherein the block copolymer (B) has at least one block which is compatible with the thermoplastic polymer (P) and at least one block which is compatible with the polyol, a process for producing such polyol dispersions, their use for producing polyurethanes and a process for producing a polyurethane.

Polyol dispersions are frequently used in polyurethane formulations in order to improve the mechanical properties, in particular of polyurethane foams.

Graft polyols which are prepared by free-radical copolymerization of, for example, acrylonitrile and styrene in classical polyetherols as matrix are known from the prior art. This polymerization takes place in the presence of macromers which comprise a dispersion-stabilizing polyether chain and an olefin group which participates in the copolymerization. The dispersion produced in this way comprises particles having a typical diameter of 1 µm and having a core of polyolefin and a polyether shell which is compatible with the matrix polyol and prevents agglomeration of the particles.

Graft polyols having small particles and a monomodal particle size distribution can be prepared, for example, by semibatch reactions as are described in a number of patents.

EP 0 221 412 A2 discloses graft polymer dispersions in polyoxyalkylene-polyether polyols for producing polyurethane foams. The graft polymers are prepared by free-radical polymerization. U.S. Pat. No. 4,568,705 and U.S. Pat. No. 4,522,976 disclose low-viscosity stable graft polymer dispersions which are likewise prepared by free-radical polymerization in the polyol itself. The use of the graft polymers for producing polyurethanes is likewise disclosed.

WO 01/27185 discloses a process for preparing polyether-polyester block copolymers, in which polyester alcohols are reacted with alkylene oxides in the presence of multimetal cyanide catalysts. Their use for producing polyurethanes is likewise disclosed.

WO 03/076488, too, relates to a process for preparing polyether alcohols using at least one double metal cyanide catalyst. Processes for producing polyurethanes using the polyether alcohols disclosed there are also described.

A disadvantage of the known graft polyols or graft polyol dispersions is that their preparation firstly requires a complicated synthesis of macromers which are then used in the polymerization. The polymerization itself also requires a high level of safety measures. The need to remove unreacted residual monomer after the reaction is likewise a disadvantage.

Starting out from this prior art, it was an object of the present invention to provide polyol dispersions which can be produced simply and inexpensively.

A further object of the invention was to provide polyol dispersions whose properties can easily be adapted.

According to the invention, this object is achieved by a polyol dispersion at least comprising
(i) at least one polyol and
(ii) at least one polymer particle mixture comprising at least one thermoplastic polymer (P) and at least one block copolymer (B),
wherein the block copolymer (B) has at least one block which is compatible with the thermoplastic polymer (P) and at least one block which is compatible with the polyol.

For the purposes of the present invention, a polyol is a polyalcohol, and for the purposes of the present patent application can also be a polyol mixture having a molecular weight distribution.

For the purposes of the present invention, polymers or block copolymers are polymeric compounds which can be characterized by methods known to those skilled in the art for polymers and usually have a molecular weight distribution. The structure of the individual molecules can also differ within the distribution usual for polymers.

For the purposes of the present invention, a polymer particle mixture is a mixture of polymer particles in which all polymer particles of the respective polymer particle mixture comprise the same thermoplastic polymer (P) and the same block copolymer (B) but, for example, the ratio of the thermoplastic polymer (P) to the block copolymer (B) in the individual polymer particles differs or the particle diameter of the individual polymer particles differs.

According to the invention, the polymer particles preferably have a structure in which the block copolymer (B) is in each case located at the surface of the polymer particles. The block copolymer (B) accordingly acts, according to the present invention, as surface-active substance in the polyol dispersions of the invention. The thermoplastic polymer (P) and the block copolymer (B) can, for example, be present in cocrystallized form in the polymer particles.

The polyol dispersions of the invention can be produced in a simple manner. It is, in particular, not necessary for a polymerization to be carried out in the polyol, in which case removal of monomer would be necessary. As a result, there is also a broader range of possible ways of combining polyol and thermoplastic polymer (P), i.e. there is no restriction to particular polymers which can be prepared by polymerization in the respective polyol. According to the invention, the thermoplastic polymer (P) can also be, in particular, a bulk plastic or a recycled product.

Compounds which are suitable as polyol for the purposes of the invention are compounds having a hydroxyl group functionality of from 2 to 8, preferably from 2 to 6, and a mean molecular weight of from 300 to 8000 g/mol, preferably from 300 to 5000 g/mol. The hydroxyl number of the polyhydroxyl compounds is generally from 20 to 160 and preferably from 28 to 70.

The hydroxyl number can, for example, be determined by quantitative reaction of the hydroxy groups with acetic anhydride and titration of the acetic acid formed by means of KOH.

The mean molecular weight can, for example, be determined by means of gel permeation chromatography (GPC). Suitable methods are known in principle to those skilled in the art. As standards for the GPC measurements, it is possible to use, for example, polystyrene or, particularly for the measurement of esters, polymethyl methacrylate.

The viscosity and the iodine number are also suitable for characterizing the polyols.

Here, the viscosity is, for example, in the range from 10 to 100 000 mPas, in particular in the range from 25 to 50 000 mPas, preferably in the range from 30 to 30 000 mPas, particularly preferably from 40 to 10 000 mPas, more preferably in the range from 50 to 5000 mPas.

For the purposes of the present invention, the iodine number of the polyols is, for example, <10 g of iodine/100 g of polymer, in particular <5 g of iodine/100 g of polymer, preferably <2.5 g of iodine/100 g of polymer, particularly preferably <2.0 g of iodine/100 g of polymer.

Preference is given to using polyetherols or polyesterols as polyol.

Polyols which are suitable for the purposes of the invention can, for example, be prepared by alkoxylation by means of propylene oxide and ethylene oxide using starter molecules bearing hydroxyl groups. Suitable compounds are described, for example, in WO 03/076488.

The present invention therefore also provides, in a further embodiment, a polyol dispersion as described above, wherein the at least one polyol is selected from the group consisting of polyetherols and polyesterols.

Suitable thermoplastic polymers (P) are, according to the invention, all polymers known to those skilled in the art for such applications, as long as they are thermoplastic polymers.

Thermoplastic polymers (P) which are suitable for the purposes of the present invention are, in particular, polystyrene, substituted polystyrenes such as alkyl-substituted polystyrenes, polyacrylates, polymethacrylates, polyolefins such as polyethylene, polypropylene, polybutadiene, polyvinyl chloride, polyacrylonitrile, polyesters such as polyethylene terephthalate, polyamides such as Nylon.

According to the invention, it is in principle possible for all thermoplastic polymers for which suitable block copolymers (B) are available to be dispersed in polyols.

Particular preference is given to polystyrene and other polyolefins, polyesters and polyamides.

Thermoplastic polymers (P) which are suitable for the purposes of the invention usually have a mean molecular weight of from 50 000 to 5 000 000 g/mol, for example from 100 000 to 1 000 000 g/mol. For the purposes of the present invention, the molecular weights are usually determined by means of GPC, generally using polystyrene standards.

Thermoplastic polymers (P) which are suitable for the purposes of the invention usually have a glass transition temperature (Tg) which is above the use temperature. Thermoplastic polymers (P) which are suitable for the purposes of the invention usually have a glass transition temperature of greater than 25° C., in particular greater than 60° C., particularly preferably greater than 80° C. The glass transition temperature is usually determined by means of DSC.

Thermoplastic polymers (P) which are suitable for the purposes of the invention can be prepared by all customary polymerization processes known to those skilled in the art. Suitable processes are, for example, free-radical or anionic polymerization processes.

According to the invention, it is also possible to use copolymers of the above-mentioned polymers, for example copolymers of styrene and acrylates, styrene and acrylonitrile or styrene and ethylene, as thermoplastic polymer (P).

The present invention therefore also provides, in a further embodiment, a polyol dispersion as described above, wherein the at least one thermoplastic polymer (P) is selected from the group consisting of polystyrene, polyethylene and polyethylene terephthalate.

According to the invention, preference is given to using recycled materials, i.e. polymers which originate from a recycling process, as thermoplastic polymer (P). Such recycled polymers can be, for example, polyethylene or polyethylene terephthalate.

The present invention therefore also provides, in a further embodiment, a polyol dispersion as described above, wherein the at least one thermoplastic polymer (P) is recycled polyethylene or recycled polyethylene terephthalate.

The advantage here is first and foremost the low price of the recycled plastic which can in this way be used in a high-value application.

As block copolymer (B), use is made, according to the invention, of a block copolymer which has at least one block which is compatible with the thermoplastic polymer (P) and at least one block which is compatible with the polyol.

According to the invention, the block copolymer can also comprise further blocks. The length of the individual blocks can be different.

According to the invention the block copolymer (B) preferably has no imide linkage containing structure. Preferably, the block copolymer (B) is no reaction product of a functionalized maleic anhydride and a monoamine polyol or a reaction product of a ethylene acrylic acid copolymer and a monoamine polyol, in particular, no reaction product of a functionalized maleic anhydride and a monoamine polyol or a reaction product of a ethylene acrylic acid copolymer and a monoamine polyol with an imide linkage.

The length of the individual blocks is usually from 5 to 60 repeating units, for example from 10 to 40 repeating units, preferably from 15 to 20 repeating units.

Polymers which are suitable as block copolymer (B) for the purposes of the invention are, for example, polyester-polyether block copolymers, polyamide-polyether block copolymers, polystyrene-polyether block copolymers or polyethylene-polyether block copolymers. According to the invention, it is possible to use diblock or triblock copolymers.

Polymers which are suitable as block copolymer (B) for the purposes of the invention are, for example, polyester-polyether block copolymers, polyamide-polyether block copolymers, polystyrene-polyether block copolymers or polyethylene-polyether block copolymers.

The present invention therefore also provides, in a further embodiment, a polyol dispersion as described above, wherein the at least one block copolymer (B) is selected from the group consisting of polyester-polyether block copolymers, polystyrene-polyether block copolymers and polyethylene-polyether block copolymers.

Polyether-polyester block copolymers or polyether-polyamide block copolymers can be prepared, for example, by alkoxylation of short-chain polyesters or polyamides by means of double metal cyanide catalysts.

As alkylene oxide, it is possible to use, for example, ethylene oxide, propylene oxide, butylene oxide, 1,2-isobutylene oxide and any mixtures of these with one another.

Preference is given to using ethylene oxide, propylene oxide and mixtures thereof.

The alkylene oxides can be used individually or, if two or more different alkylene oxides are used, in any mixing ratio. Furthermore, the mixing ratio of the alkylene oxides can be varied either discontinuously or continuously during the synthesis.

A large number of the necessary short-chain polyesters having hydroxy end groups are commercially available; these are likewise used as polyesterols in polyurethane systems.

The block copolymer (B) can be prepared by all customary methods known to those skilled in the art. Suitable methods are described, for example, in "Anionic synthesis of well-defined, poly[(styrene)-block-(propylene oxide) block copolymers"; R. P. Quirk, G. M. Lizarraga; Macrom. Chem. a. Phys., 2001, 1395-1404.

The structure of polyester-polyether block copolymers is described, for example, in WO 01/27185 or WO 03/76488, whose relevant contents are incorporated by reference.

Polyester-polyether block copolymers can also be prepared, for example, via a condensation reaction of relatively long-chain polyethylene glycols with bifunctional acids such as terephthalic acid or adipic acid and other diols such as monoethylene glycol, diethylene glycol or 1,4-butanediol.

A possible way of synthesizing polystyrene-polyether block copolymers is, for example, the living anionic polymerization of styrene and alkylene oxides. As alkylene oxides, it is possible to use, in particular, those mentioned above, particularly preferably ethylene oxide or propylene oxide or mixtures thereof.

Block copolymers which are suitable for the purposes of the invention preferably have a molecular weight in the range from 3000 to 30 000 g/mol, in particular from 6000 to 15 000 g/mol. The molecular weights are usually determined by means of GPC.

The proportion of the block copolymer (B) is usually from 0.1 to 10% by weight, preferably from 0.2 to 5% by weight, in particular from 0.5 to 3% by weight, based on the total weight of the thermoplastic polymer (P) used.

The required amount of the block copolymer is dependent on the desired mean particle diameter of the polymer particle mixture and on the molecular weight of the block copolymer (B) used. The greater the desired particle diameter, the less block copolymer is used according to the invention.

The present invention therefore also provides, in a further embodiment, a polyol dispersion as described above, wherein the at least one block copolymer (B) is comprised in an amount of from 0.1 to 10% by weight, based on the total weight of the thermoplastic polymer (P) used, in the polymer particle mixture.

In a preferred embodiment, the present invention provides a polyol dispersion at least comprising
  (i) at least one polyol and
  (ii) at least one polymer particle mixture comprising at least polystyrene as thermoplastic polymer (P) and at least one polystyrene-polyether block copolymer as block copolymer (B).

In a further preferred embodiment, the present invention provides a polyol dispersion at least comprising
  (i) at least one polyol and
  (ii) at least one polymer particle mixture comprising at least polyethylene terephthalate as thermoplastic polymer (P) and at least one polyester-polyether block copolymer as block copolymer (B).

In a likewise preferred embodiment, the present invention provides a polyol dispersion at least comprising
  (i) at least one polyol and
  (ii) at least one polymer particle mixture comprising at least polyethylene as thermoplastic polymer (P) and at least one polyethylene-polyether block copolymer as block copolymer (B).

In a preferred embodiment, the present invention provides a polyol dispersion at least comprising
  (i) at least one polyetherol as polyol and
  (ii) at least one polymer particle mixture comprising at least polystyrene as thermoplastic polymer (P) and at least one polystyrene-polyether block copolymer as block copolymer (B).

In a further preferred embodiment, the present invention provides a polyol dispersion at least comprising
  (i) at least one polyetherol as polyol and
  (ii) at least one polymer particle mixture comprising at least polyethylene terephthalate as thermoplastic polymer (P) and at least one polyester-polyether block copolymer as block copolymer (B).

In a likewise preferred embodiment, the present invention provides a polyol dispersion at least comprising
  (i) at least one polyetherol as polyol and
  (ii) at least one polymer particle mixture comprising at least polyethylene as thermoplastic polymer (P) and at least one polyethylene-polyether block copolymer as block copolymer (B).

In a preferred embodiment, the present invention provides a polyol dispersion at least comprising
  (i) at least one polyesterol as polyol and
  (ii) at least one polymer particle mixture comprising at least polystyrene as thermoplastic polymer (P) and at least one polystyrene-polyether block copolymer as block copolymer (B).

In a further preferred embodiment, the present invention provides a polyol dispersion at least comprising
  (i) at least one polyesterol as polyol and
  (ii) at least one polymer particle mixture comprising at least polyethylene terephthalate as thermoplastic polymer (P) and at least one polyester-polyether block copolymer as block copolymer (B).

In a likewise preferred embodiment, the present invention provides a polyol dispersion at least comprising
  (i) at least one polyesterol as polyol and
  (ii) at least one polymer particle mixture comprising at least polyethylene as thermoplastic polymer (P) and at least one polyethylene-polyether block copolymer as block copolymer (B).

According to the invention, the polymer particle mixture comprised in the polyol dispersion has a mean particle diameter of from 0.01 to 5.0 micrometer. The mean particle diameter is preferably in the range from 0.05 to 4.0 micrometer, in particular from 0.1 to 3.0 micrometer, preferably from 0.5 to 2.0 micrometer, particularly preferably from 0.75 to 1.0 micrometer.

The present invention therefore also provides, in a further embodiment, a polyol dispersion as described above, wherein the polymer particle mixture comprised in the polyol dispersion has a mean particle diameter in the range from 0.01 to 5.0 micrometer.

The total solids content of the polyol dispersions according to the invention can vary within a wide range. The polyol dispersions of the invention have, for example, a total solids content of from 5 to 65% by weight, advantageously from 10 to 50% by weight.

The particle diameters and their distribution can be determined by means of dynamic light scattering and Fraunhofer diffraction.

For the purposes of the present invention, the solids content of the polyol dispersions is the percentage ratio of the polymer particle mixture to the polyol used. The solids content can, for example, be determined gravimetrically from the percentage ratio of the mass of solids to the total mass of the polyol dispersion.

The present invention therefore also provides, in a further embodiment, a polyol dispersion as described above, wherein the polyol dispersion has a solids content of from 5 to 65% by weight.

The polyol dispersions of the invention can comprise one or more polyols. The polyols can differ, for example, in terms of the OH number, the chemical structure, the functionality or the primary OH group content. It is likewise possible, according to the present invention, for the polyol dispersions of the invention to comprise one or more different polymer particle mixtures.

According to the invention, it is also possible for the polyol dispersion to additionally comprise a graft polyol. This can, for example, be added to a polyol dispersion according to the invention.

The present invention also provides a process for producing a polyol dispersion, which comprises the steps
  (a) heating of a composition (I) comprising at least one thermoplastic polymer (P), at least one polyol and at least one block copolymer (B) having at least one block which is compatible with the thermoplastic polymer (P) and at least one block which is compatible with the polyol to give a composition (II), (b) cooling of the composition (II).

The process of the invention allows the inexpensive production of polyol dispersions in a simple manner.

In step (a) of the process of the invention, the composition (I) is heated to a temperature at which the thermoplastic polymer (P) used melts. The other components used are preferably not decomposed at the temperature selected.

According to the invention, the thermoplastic polymer (P) is melted on heating the composition in step (a). An emulsion in which the block copolymer (B) is preferably predominantly present at the interface of the thermoplastic polymer (P) and polyol is formed here according to the invention. For the purposes of the present invention, composition (II) is preferably an emulsion.

On cooling of the composition (II), the polymer droplets solidify or crystallize according to the invention, forming a polymer particle mixture comprising at least one thermoplastic polymer (P) and at least one block copolymer (B).

According to the invention, not only heating of the composition (I) but also mixing takes place in step (a), so that the thermoplastic polymer (P) is preferably present in the form of finely divided droplets in the composition (II).

The incorporation according to the invention of the thermoplastic polymers takes place at elevated temperatures by means of vigorous mixing, preferably by stirring, with addition of the surface-active block copolymers. This preferably results firstly in formation of an emulsion of molten polymer droplets in the polyol. The droplet size can be controlled by means of the stirring energy introduced and the type and amount of block copolymer (B) added.

As a result of cooling of the emulsion, the polymer droplets solidify, with the regions of the block copolymer (B) which are compatible with the thermoplastic polymer (P) preferably partly being crystallized in and thus being firmly bound to the polymer particle. The polyether blocks of the block copolymers are preferably located at the surface of the polymer particles and can effect stabilization of the dispersion obtained.

According to the invention, step (a) or step (b) or step (a) and step (b) of the process of the invention is/are carried out with stirring.

The present invention therefore also provides, in a further embodiment, a process as described above for producing a polyol dispersion, wherein step (a) of the process is carried out with stirring.

According to the invention, the temperature in step (a) has to be above the melting point of the thermoplastic polymer (P).

According to the invention, it is also possible for the heating in step (a) to be carried out in an extruder, preferably in a twin-screw extruder.

For some applications, it can be advantageous for the polymer particles to have a narrow particle diameter distribution. In particular, it can be advantageous for the polyol dispersion to comprise no large particles, i.e. particles having a diameter of greater than 10 µm, which can lead to problems during processing, for example blockage of filters, screens or nozzles. For this reason, the polyol dispersion obtained by the process of the invention is, in one embodiment of the process of the invention, purified by means of single-stage or multi-stage filtration after cooling in step (b).

Polyols suitable for the process of the invention are, in particular, the polyols mentioned above.

The present invention therefore also provides, in a further embodiment, a process as described above for producing a polyol dispersion, wherein the at least one polyol is selected from the group consisting of polyetherols and polyesterols.

Suitable thermoplastic polymers (P) for the process of the invention are, in particular, the polymers mentioned above.

The present invention therefore also provides, in a further embodiment, a process as described above for producing a polyol dispersion, wherein the at least one thermoplastic polymer (P) is selected from the group consisting of polystyrene, polyethylene and polyethylene terephthalate.

Suitable block copolymers (B) for the process of the invention are, in particular, the block copolymers mentioned above.

The present invention therefore also provides, in a further embodiment, a process as described above for producing a polyol dispersion, wherein the at least one block copolymer (B) is selected from the group consisting of polyester-polyether block copolymers, polystyrene-polyether block copolymers, and polyethylene-polyether block copolymers.

According to the invention, block copolymer (B) and thermoplastic polymer (P) are used in amounts which correspond to the desired ratio in the polymer particle mixture.

The present invention therefore also provides, in a further embodiment, a process as described above for producing a polyol dispersion, wherein the at least one block copolymer (B) is used in an amount of from 0.1 to 10% by weight, based on the total weight of the thermoplastic polymer (P) used.

The polyol dispersions of the invention or the polyol dispersions obtainable by a process according to the invention are suitable, in particular, for the production of polyurethanes.

The present invention therefore also provides for the use of a polyol dispersion as described above or a polyol dispersion obtainable by a process as described above for producing polyurethanes.

The use of the polyol dispersions of the invention in the production of polyurethanes, in particular polyurethane foams, enables the foaming behavior, in particular the cell opening behavior, to be influenced in a positive way. As a result of the disperse phase, i.e. the solids in the polyol dispersion, the hardness of the polyurethane foams is increased compared to foams which are produced without the addition of the polyol dispersions of the invention.

Processes and starting materials for the production of polyurethanes are known in principle to those skilled in the art. It is usual to react at least one polyol component and at least one polyisocyanate.

The present invention therefore also provides a process for producing a polyurethane, wherein at least one polyol dispersion as described above or a polyol dispersion obtainable by one of the processes as described above is reacted with at least one polyisocyanate.

According to the invention, the production of the polyurethanes is effected, in particular, by reaction of organic and/or modified organic polyisocyanates with the above-described polyol dispersions of the invention and, if appropriate, further compounds having hydrogen atoms which are reactive toward isocyanates in the presence of catalysts, if appropriate water and/or other blowing agents and, if appropriate, further auxiliaries and additives.

According to the invention, the polyol dispersion of the invention or the polyol dispersion obtainable by a process according to the invention can be used either alone or together with at least one further polyol or together with at least one graft polyol or together with at least one further polyol and at least one graft polyol.

As regards the further starting components which can be used in addition to the polyol dispersions of the invention, the following details may be provided:

As polyisocyanates, it is in principle possible, according to the invention, to use all polyisocyanates known to those skilled in the art, in particular aliphatic, cycloaliphatic, araliphatic and preferably aromatic polyfunctional isocyanates.

Examples of suitable polyisocyanates are: alkylene diisocyanates having from 4 to 12 carbon atoms in the alkylene radical, e.g. dodecane 1,12-diisocyanate, 2-ethyl-tetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanato-methylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic diisocyanates and polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates.

The organic diisocyanates and polyisocyanates can be used individually or in the form of their mixtures.

Preference is given to using tolylene diisocyanate, mixtures of diphenylmethane diisocyanate isomers, mixtures of diphenylmethane diisocyanate and crude MDI or tolylene diisocyanate with diphenylmethane diisocyanate and/or crude MDI. Particular preference is given to using mixtures of diphenylmethane diisocyanate isomers having proportions of diphenylmethane 2,4'-diisocyanate of at least 30% by weight.

Use is frequently also made of modified polyfunctional isocyanates, i.e. products which are obtained by chemical reaction of organic diisocyanates and/or polyisocyanates. Examples which may be mentioned are diisocyanates and/or polyisocyanates comprising ester, urea, biuret, allophanate, carbodiimide, isocyanurate, uretdione and/or urethane groups. Specific examples are: organic, preferably aromatic, polyisocyanates comprising urethane groups and having NCO contents of from 43 to 15% by weight, preferably from 31 to 21% by weight, based on the total weight, diphenylmethane 4,4'-diisocyanate modified by reaction with, for example, low molecular weight diols, triols, dialkylene glycols, trialkylene glycols or polyoxyalkylene glycols having mean molecular weights of up to 6000 g/mol, in particular mean molecular weights up to 1500 g/mol, modified diphenylmethane 4,4'-diisocyanate, modified diphenylmethane 4,4'- and 2,4'-diisocyanate mixtures or modified crude MDI or tolylene 2,4- or 2,6-diisocyanate. The dialkylene glycols or polyoxyalkylene glycols can be used individually or as mixtures; examples are: diethylene glycol, dipropylene glycol, polyoxyethylene, polyoxypropylene and polyoxypropylene-polyoxyethene glycols, triols and/or tetrols. Also suitable are prepolymers which comprise NCO groups and have NCO contents of from 25 to 35% by weight, preferably from 21 to 14% by weight, based on the total weight, and are prepared from polyester polyols and/or preferably polyether polyols and diphenylmethane 4,4'-diisocyanate, mixtures of diphenylmethane 2,4'- and 4,4'-diisocyanate, tolylene 2,4- and/or 2,6-diisocyanates or crude MDI. Further suitable polyisocyanates are liquid polyisocyanates comprising carbodiimide groups and/or isocyanurate rings and having NCO contents of from 43 to 15% by weight, preferably from 31 to 21% by weight, based on the total weight, e.g. ones based on diphenylmethane 4,4'-, 2,4'- and/or 2,2'-diisocyanate and/or tolylene 2,4- and/or 2,6-diisocyanate.

The modified polyisocyanates can, according to the invention, also be mixed with one another or with unmodified organic polyisocyanates such as diphenylmethane 2,4'-, 4,4'-diisocyanate, crude MDI, tolylene 2,4- and/or 2,6-diisocyanate.

Particularly useful modified organic polyisocyanates are prepolymers which comprise NCO groups and are advantageously formed by reaction of the isocyanates with polyols and, if appropriate, further compounds having functional groups which are reactive toward isocyanates.

Apart from the above-described polyol dispersions of the invention, further compounds having hydrogen atoms which are reactive toward isocyanates may be added if appropriate.

Possible compounds here are, for example, compounds having at least two reactive hydrogen atoms. It is advantageous to use ones having a functionality of from 2 to 8, preferably from 2 to 3, and a mean molecular weight of from 300 to 8000, preferably from 300 to 5000. The hydroxyl number of the polyhydroxyl compounds is generally from 20 to 160 and preferably from 28 to 70.

The polyhydroxy compounds used according to the invention, for example polyether polyols, are prepared by known methods. For example, they can be prepared by anionic polymerization using alkali metal hydroxides such as sodium or potassium hydroxide or alkali metal alkoxides such as sodium methoxide, sodium or potassium ethoxide or potassium isopropoxide as catalysts with addition of at least one starter molecule having from 2 to 8, preferably from 2 to 3, reactive hydrogen atoms or by cationic polymerization using Lewis acids such as antimony pentachloride, boron fluoride etherate, etc., or bleaching earth as catalysts. Polyhydroxy compounds can likewise be prepared from one or more alkylene oxides having from 2 to 4 carbon atoms in the alkylene radical by means of double metal cyanide catalysis. For specific applications, monofunctional starters can also be incorporated into the polyether structure.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures.

Possible starter molecules are, for example: water, organic dicarboxylic acids such as succinic acid, adipic acid, phthalic acid and terephthalic acid, aliphatic and aromatic, optionally N-monoalkyl-, N,N-dialkyl- and N,N'-dialkyl-substituted diamines having from 1 to 4 carbon atoms in the alkyl radical, e.g. optionally monoalkyl- and dialkyl-substituted ethylenediamine, diethylenetriamine, triethylenetetramine, 1,3-propylene-diamine, 1,3- or 1,4-butylenediamine, 1,2-, 1,3-, 1,4-, 1,5- and 1,6-hexamethylene-diamine, phenylenediamine, 2,3-, 2,4- and 2,6-toluenediamine and 4,4'-, 2,4'- and 2,2'-diaminodiphenylmethane. Further possible starter molecules are: alkanolamines such as ethanolamine, N-methylethanolamine and N-ethylethanolamine, dialkanolamines such as diethanolamine, N-methyldiethanolamine and N-ethyldiethanolamine, trialkanolamines such as triethanolamine, and ammonia. Preference is given to using polyhydric, in particular dihydric and/or trihydric, alcohols such as ethanediol, 1,2- and 2,3-propanediol, diethylene glycol, dipropylene glycol, 1,4-butanediol, 1,6-hexanediol, glycerol, trimethylolpropane, pentaerythritol.

The polyether polyols, preferably polyoxypropylene polyols and polyoxypropylene-polyoxyethylene polyols, have a functionality of preferably from 2 to 8 and in particular from 2 to 3 and mean molecular weights of from 300 to 8000 g/mol, preferably from 300 to 6000 g/mol and in particular from 1000 to 5000 g/mol. Suitable polyoxytetramethylene glycols have, for example, a mean molecular weight up to about 3500 g/mol.

The polyhydroxy compounds, in particular polyether polyols, can be used individually or in the form of mixtures.

Apart from the polyether polyols described, it is also possible to use, for example, polyether polyamines and/or further polyols selected from the group consisting of polyester polyols, polythioether polyols, polyesteramides, hydroxyl-comprising polyacetals and hydroxyl-comprising aliphatic polycarbonates or mixtures of at least two of the polyols mentioned.

The hydroxyl number of the polyhydroxyl compounds is generally from 20 to 80 and preferably from 28 to 70.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms, by customary methods. The organic polycarboxylic acids and/or derivatives thereof and polyhydric alcohols are usually polycondensed, advantageously in a molar ratio of from 1:1 to 1:1.8, preferably from 1:1.05 to 1:1.2, in the absence of catalysts or preferably in the presence of esterification catalysts, advantageously in an atmosphere of inert gas such as nitrogen, carbon monoxide, helium, argon, etc., in the melt at temperatures of from 150 to 250° C., preferably from 180 to 220° C., if appropriate under reduced pressure, to the desired acid number which is advantageously less than 10, preferably less than 2.

Possible hydroxyl-comprising polyacetals are, for example, the compounds which can be prepared from glycols such as diethylene glycol, triethylene glycol, 4,4'-dihydroxyethoxydiphenyldimethylmethane, hexanediol and formaldehyde. Suitable polyacetals can also be prepared by polymerization of cyclic acetals. Possible polycarbonates having hydroxyl groups are those of the type known per se, which can be prepared, for example, by reaction of diols such as 1,3-propanediol, 1,4-butanediol and/or 1,6-hexanediol, diethylene glycol, triethylene glycol or tetraethylene glycol with diaryl carbonates, e.g. diphenyl carbonate, or phosgene. Polyesteramides include, for example, the predominantly linear condensates obtained from polybasic, saturated and/or unsaturated carboxylic acids or their anhydrides and polyhydric saturated and/or unsaturated amino alcohols or mixtures of polyhydric alcohols and amino alcohols and/or polyamines. Suitable polyetherpolyamines can be prepared from the abovementioned polyether polyols by known methods. Examples which may be mentioned are the cyanoalkylation of polyoxyalkylene polyols and subsequent hydrogenation of the nitrile formed or the partial or complete amination of polyoxyalkylene polyols with amines or ammonia in the presence of hydrogen and catalysts.

The polyhydroxy compounds can be used individually or in the form of mixtures.

The polyurethanes can, according to the invention, be produced without or with concomitant use of chain extenders and/or crosslinkers.

As chain extenders and/or crosslinkers, it is possible to use diols and/or triols having molecular weights of less than 400 g/mol, preferably from 60 to 300 g/mol. Examples are aliphatic, cycloaliphatic and/or araliphatic diols having from 2 to 14, preferably from 4 to 10, carbon atoms, e.g. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4- and 1,3,5-trihydroxycyclohexane, triethanolamine, diethanolamine, glycerol and trimethylolpropane and low molecular weight hydroxyl-comprising polyalkylene oxides based on ethylene and/or 1,2-propylene oxide and the abovementioned diols and/or triols as starter molecules.

If chain extenders, crosslinkers or mixtures thereof are employed for the production according to the invention of polyurethanes, they are advantageously used in an amount up to 10% by weight, based on the weight of the sum of the polyol compounds.

As blowing agents, it is possible to use the chlorofluorocarbons (CFCs) and highly fluorinated and/or perfluorinated hydrocarbons generally known from polyurethane chemistry. According to the invention, it is also possible to use, in particular, aliphatic and/or cycloaliphatic hydrocarbons, in particular pentane and cyclopentane, or acetals such as methylal and $CO_2$ as blowing agents. These physical blowing agents are usually added to the polyol component. However, they can also be added to the isocyanate component or, as a combination, both to the polyol component and to the isocyanate component.

It is also possible to use a plurality of blowing agents together, in particular in the form of an emulsion in the polyol component. If emulsifiers are employed, the emulsifiers used are usually oligomeric acrylates which comprise polyoxyalkylene and fluoroalkane radicals bound as side groups and have a fluorine content of from about 5 to 30% by weight. Such products are adequately known from plastics chemistry and are disclosed, for example, in EP 0 351 614 A. The amount of blowing agent or blowing agent mixture used is from 1 to 25% by weight, preferably from 1 to 15% by weight, in each case based on the total weight of the components used.

Furthermore, it is possible and customary to add from 0.5 to 15% by weight, preferably from 1 to 5% by weight, based on the total weight of the components used, of water as blowing agent to the polyol component. The addition of water can be combined with the use of the other blowing agents described.

For the purposes of the invention, preference is given to using water as blowing agent.

Catalysts used for producing the polyurethanes are, in particular, compounds which strongly accelerate the reaction of the reactive hydrogen atoms, in particular hydroxyl-comprising compounds, with the organic, if appropriate modified polyisocyanates. Possible catalysts are organic metal compounds, preferably organic tin compounds such as the tin(II) salts of organic carboxylic acids, e.g. tin(II) acetate, tin(II) octoate, tin(II) ethylhexanoate and tin(II) laurate, and the dialkyltin(IV) salts of organic carboxylic acids.

Suitable compounds of this type are, for example, dibutyltin diacetate, dibutyltin dilaurate, dibutyltin maleate and dioctyltin diacetate. The organic metal compounds are used either alone or preferably in combination with strongly basic amines. Examples which may be mentioned are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexyl-morpholine, N,N,N',N'-tetramethylethylenediamine, N,N,N',N'-tetramethylbutane-diamine, N,N,N',N'-tetramethylhexane-1,6-diamine, pentamethyldiethylenetriamine, bis(dimethylaminoethyl)ether, bis(dimethylaminopropyl)urea, dimethylpiperazine, 1,2-dimethylimidazole, 1-azabicyclo

[3.3.0]octane and preferably 1,4-diazabicyclo-[2.2.2]octane, and aminoalkanol compounds such as triethanolamine, triisopropanolamine, N-methyldiethanolamine and N-ethyldiethanolamine and dimethylethanolamine.

Further possible catalysts are: tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide, and alkali metal alkoxides such as sodium methoxide and potassium isopropoxide, and also alkali metal salts of long-chain fatty acids having from 10 to 20 carbon atoms and, if appropriate, lateral OH groups.

Preference is given to using from 0.001 to 5% by weight, in particular from 0.05 to 2% by weight, of catalyst or catalyst combination, based on the weight of the formative components.

If appropriate, further auxiliaries and/or additives can be added to the reaction mixture for the production according to the invention of polyurethanes. Examples which may be mentioned are flame retardants, stabilizers, fillers, dyes, pigments and hydrolysis inhibitors and also fungistatic and bacteriostatic substances.

Suitable flame retardants are, for example, tricresyl phosphate, tris(2-chloroethyl) phosphate, tris(2-chloropropyl) phosphate, tetrakis(2-chloroethyl)ethylenediphosphate, dimethyl methanephosphonate, diethyl diethanolaminomethylphosphonate and also commercial halogen-comprising and halogen-free flame retardants. Apart from the abovementioned halogen-substituted phosphates, it is also possible to use inorganic or organic flame retardants such as red phosphorus, aluminum oxide hydrate, antimony trioxide, arsenic oxide, ammonium polyphosphate and calcium sulfate, expandable graphite or cyanuric acid derivatives such as melamine or mixtures of at least two flame retardants such as ammonium polyphosphates and melamine and also, if appropriate, maize starch or ammonium polyphosphate, melamine and expandable graphite and/or optionally aromatic polyesters for making the polyisocyanate polyaddition products flame resistant. Additions of melamine are found to be particularly effective. In general, it has been found to be advantageous to use from 5 to 50% by weight, preferably from 5 to 30% by weight, of the flame retardants mentioned per 100% by weight of the other components used.

Stabilizers used are, in particular, surface-active substances, i.e. compounds which serve to aid the homogenization of the starting materials and, if appropriate, are also suitable for regulating the cell structure of the polyurethane. Mention may be made by way of example of emulsifiers such as sodium salts of castor oil sulfates or fatty acids and amine salts of fatty acids, e.g. diethylamine oleate, diethanolamine stearate, diethanolamine ricinoleate, salts of sulfonic acids, e.g. alkali metal or ammonium salts of dodecylbenzenedisulfonic or dinaphthylmethanedisulfonic acid and ricinoleic acid; foam stabilizers such as siloxane-oxalkylene copolymers and other organo-polysiloxanes, ethoxylated alkylphenols, ethoxylated fatty alcohols, paraffin oils, castor oil esters or ricinoleic esters, Turkey red oil and peanut oil, and cell regulators such as paraffins, fatty alcohols and dimethylpolysiloxanes. Stabilizers employed are predominantly organopolysiloxanes which are soluble in water. These are polydimethylsiloxane radicals onto which a polyether chain comprising ethylene oxide and propylene oxide is grafted. The surface-active substances are usually used in amounts of from 0.01 to 5% by weight, based on 100% by weight of the other components used.

For the purposes of the present invention, fillers, in particular reinforcing fillers, are the known and customary organic and inorganic fillers, reinforcing materials, weighting agents, agents for improving the abrasion behavior in paints, coating compositions, etc. Specific examples are: inorganic fillers such as siliceous minerals, for example sheet silicates such as antigorite, serpentine, hornblendes, amphiboles, chrysotile and talc, metal oxides such as kaolin, aluminum oxides, titanium oxides and iron oxides, metal salts such as chalk, barite and inorganic pigments such as cadmium sulfide and zinc sulfide, and also glass, etc. Preference is given to using kaolin (china clay), aluminum silicate and coprecipitates of barium sulfate and aluminum silicate and also natural and synthetic fibrous minerals such as wollastonite, metal fibers and in particular glass fibers of various lengths which may, if appropriate, also be coated with a size. Possible organic fillers are, for example: carbon, rosin, cyclopentadienyl resins and graft polymers and also cellulose fibers, polyamide, polyacrylonitrile, polyurethane, polyester fibers based on aromatic and/or aliphatic dicarboxylic esters and in particular carbon fibers. The inorganic and organic fillers can be used individually or as mixtures and are advantageously added to the reaction mixture in amounts of from 0.5 to 50% by weight, preferably from 1 to 40% by weight, based on the weight of the other components used, but the content of mats, nonwovens and woven fabrics composed of natural and synthetic fibers can reach values up to 80% by weight.

Further details regarding the abovementioned other customary auxiliaries and additives may be found in the technical literature, for example the monograph by J. H. Saunders and K. C. Frisch "High Polymers" volume XVI, "Polyurethanes", parts 1 and 2, Interscience Publishers 1962 and 1964, or the above-cited Kunststoffhandbuch, "Polyurethane", volume VII, Hanser-Verlag, Munich, Vienna, 1st to 3rd edition.

To produce the polyurethanes according to the invention, the organic and/or modified organic polyisocyanates, the polyol dispersion and, if appropriate, the further compounds having hydrogen atoms which are reactive toward isocyanates and also further constituents are reacted in such amounts that the equivalence ratio of NCO groups of the polyisocyanates to the sum of the reactive hydrogen atoms of the other components is less than 0.95:1, preferably less than 0.70:1.

Polyurethane foams can be produced, for example, by the one-shot process, for example by means of the high-pressure or low-pressure technique, in open or closed molds, for example metallic molds. Continuous application of the reaction mixture to suitable conveyor belts or discontinuous introduction into open block molds for producing slabstock foams are also customary.

Molded foams can also be produced by the two-component process.

Slabstock foams are usually produced by the multicomponent process. The reaction products are, in the case of slabstock foams, combined in a mixing head and applied directly or via a trough to the open foaming strip.

The temperatures here are preferably in the range from 20 to 25° C.

The starting components are mixed at a temperature of from 15 to 90° C., preferably from 20 to 60° C. and in particular from 20 to 35° C., and introduced into the open mold or, if appropriate under superatmospheric pressure, into the closed mold or applied in a continuous workstation to a belt which accommodates the reaction composition. Mixing can be carried out mechanically by means of a stirrer, by means of a stirring screw or by means of high-pressure mixing in a nozzle. The mold temperature is advantageously from 20 to 110° C., preferably from 30 to 60° C. and in particular from 35 to 55° C.

The polyurethane foams advantageously have a density of from 10 to 150 kg/m$^3$, preferably from 40 to 60 kg/m$^3$ in the case of molded foams and preferably from 14 to 100 kg/m$^3$ and in particular from 20 to 80 kg/m$^3$ in the case of slabstock foams. The compressive strengths are then in the range from 1 to 20 kPa, preferably from 1.5 to 12 kPa.

The polyol dispersions of the invention display good flow behavior under high shear stress and are therefore particularly suitable for producing polyurethane foams. As a result, the filtration rate in purification of the polyol dispersion after production is increased or a smaller filter area is required for the same throughputs.

Furthermore, they display a good storage stability and very good processing properties in the further processing to polyurethane end products. In the case of foam shapes having complicated geometries (automobile carpet backing, automobile seats, etc.), the reaction mixture flows well which leads to a reduction in formation of voids.

Owing to the improved cell opening behavior when the polyol dispersions of the invention are used, the use of cell-opening polyols and other processing aids can be restricted, for example in high-resilience foam formulations, which makes the formulation cheaper, eliminates a possible source of metering errors and improves the foam properties. Particular mention may be made of, for example, improved elongations at break and tear propagation resistances in the case of molded foams or improved values for tensile strength, elongation and compression set in the case of conventional slabstock foams having increased load-bearing capability.

The present invention is illustrated by the following non-limiting examples.

EXAMPLES

Example 1

Synthesis of the Polyester Block (Oligoester of Diethylene Glycol and Terephthalic Acid)

925.3 g of dimethyl terephthalate and 546.2 g of diethylene glycol were heated to 180° C. in a multinecked flask. The methanol formed in the condensation reaction was distilled off via a distillation head. After methanol formation slowed, 4 ppm of titanium tetrabutoxide in the form of a 0.1% solution in toluene were added and the temperature was increased to 220° C. Under these conditions, the reaction was continued to completion; the total reaction time was 40 hours. Cooling gave a yellowish brown viscous product which solidified to a wax-like material after cooling.

Acid number: 1.1 mg KOH/g, hydroxyl number: 42 mg KOH/g.

Example 2

Synthesis of the Block Copolymers

In a pressure autoclave, 100 g of the ester from example 1 were admixed with 150 mg of DMC catalyst and heated to the reaction temperature of 120° C. At this temperature, 200 g of propylene oxide were slowly added dropwise at such a rate that the internal pressure did not rise above 6 bar. After about one hour, the reaction was complete and 290 g of a viscous slightly yellow product were obtained. According to GPC analysis, the product has a mean molecular weight of about 5000 g/mol and a broad molecular weight distribution.

For the GPC, the sample was measured as a solution in THF (50 mg in 6 ml) using an HP1090 instrument and a column set from Polymer Laboratories type "5 µm Mixed C" 300*7.5 mm. Calibration was carried out using polystyrene standards from Polymer Laboratories.

Example 3

Production of the Polyol Dispersion 200 g of Lupranol 2081 were placed in a round-bottomed flask with stirrer and heated to 170° C. under a nitrogen atmosphere. At this temperature, 10 g of powdered block copolymer from example 2 and 150 g of shredded polyethylene terephthalate (PET) from recycling of beverage bottles were slowly added with vigorous stirring. The temperature was briefly increased to 250° C. to melt the shredded PET. After the dispersion had been formed, it was cooled rapidly by means of a water bath to keep thermal stress as low as possible. After complete cooling, a stable dispersion having a hydroxyl number of 26 mg KOH/g was obtained.

The invention claimed is:

1. A polyol dispersion comprising
   (i) at least one polyol selected from the group consisting of polyetherols and polyesterols,
   (ii) at least one polymer particle mixture comprising at least one thermoplastic polymer (P) selected from the group consisting of polyesters and polyamides and copolymers of said polymers, and at least one block copolymer (B) selected from the group consisting of polyester-polyether block copolymers and polyamide-polyether block copolymers,
   wherein said at least one block copolymer (B) has at least one block which is compatible with said at least one thermoplastic polymer (P) and at least one block which is compatible with the polyol, wherein said at least one block copolymer (B) is in an amount of from 0.1 to 10% by weight, based on the total weight of the thermoplastic polymer (P) used, in the polymer particle mixture, and all polymer particles of said at least one polymer particle mixture comprise said at least one thermoplastic polymer (P) and said at least one block copolymer (B), and wherein the thermoplastic polymer (P) is formed prior to its addition to the polyol.

2. The polyol dispersion according to claim 1, wherein the polyol dispersion has a solids content of from 5 to 65% by weight.

3. The polyol dispersion according to claim 1, wherein the polymer particle mixture in the polyol dispersion has a mean particle diameter in the range from 0.01 to 5.0 micrometer.

4. A process for producing a polyurethane, comprising reacting at least one polyol dispersion according to claim 1 with at least one polyisocyanate.

5. The polyol dispersion according to claim 1, wherein said at least one block copolymer (B) is in an amount of from 0.2 to 5% by weight, based on the total weight of the thermoplastic polymer (P) used, in said at least one polymer particle mixture.

6. The polyol dispersion according to claim 1, wherein the polymer particles of the polymer particle mixture have a structure in which block copolymer (B) is located at the surface of the polymer particles.

7. The polyol dispersion according to claim 1, wherein the block copolymer (B) used is in an amount of from 0.5 to 3% by weight, based on the total weight of the thermoplastic polymer (P) used.

8. The polyol dispersion according to claim 1, wherein the polymer particle mixture in the polyol dispersion has a mean particle diameter in the range from 0.05 to 4.0 micrometer.

9. The polyol dispersion according to claim 1, wherein the polymer particle mixture in the polyol dispersion has a mean particle diameter in the range from 0.1 to 3.0 micrometer.

10. The polyol dispersion according to claim 1, wherein the polymer particle mixture in the polyol dispersion has a mean particle diameter in the range from 0.5 to 2.0 micrometer.

11. The polyol dispersion according to claim 1, wherein the polymer particle mixture in the polyol dispersion has a mean particle diameter in the range from 0.75 to 1.0 micrometer.

12. The polyol dispersion according to claim 1, wherein the polyol dispersion has a solids content of from 10 to 50% by weight.

* * * * *